Dec. 27, 1955 P. S. PAUL ET AL 2,728,172
TIRE TRUING DEVICE
Filed Aug. 25, 1953 3 Sheets-Sheet 1

Percy S. Paul
Frank D. Clayton, Jr.
INVENTORS

Dec. 27, 1955

P. S. PAUL ET AL 2,728,172

TIRE TRUING DEVICE

Filed Aug. 25, 1953

Percy S. Paul
Frank D. Clayton, Jr.
INVENTORS

Dec. 27, 1955 P. S. PAUL ET AL 2,728,172
TIRE TRUING DEVICE
Filed Aug. 25, 1953 3 Sheets-Sheet 3
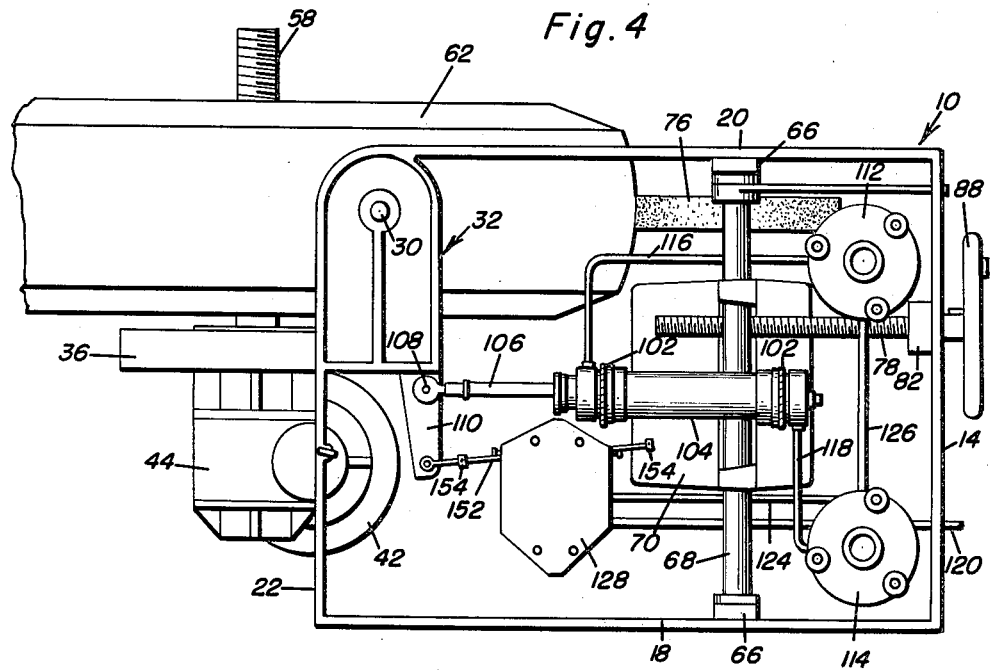
Fig. 4
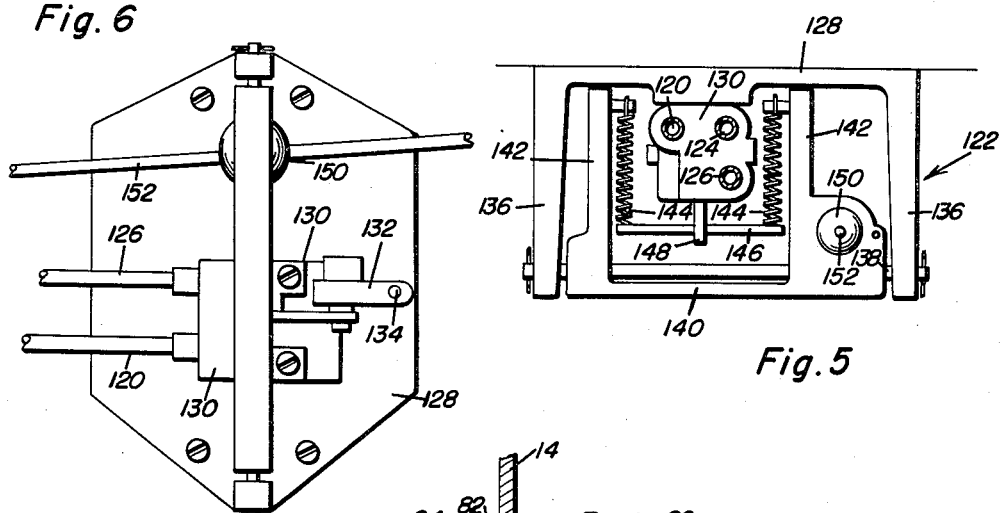
Fig. 6
Fig. 5
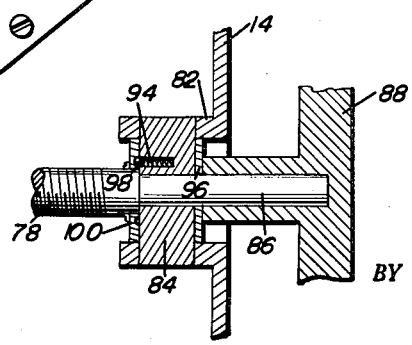
Fig. 8
Percy S. Paul
Frank D. Clayton, Jr.
INVENTORS
BY *Clarence A. O'Brien*
and *Harvey B. Jackson*
Attorneys United States Patent Office 2,728,172
Patented Dec. 27, 1955

2,728,172

TIRE TRUING DEVICE

Percy S. Paul and Frank D. Clayton, Jr.,
Oklahoma City, Okla.

Application August 25, 1953, Serial No. 376,334

4 Claims. (Cl. 51—97)

This invention relates in general to improvements in abrading machines, and more specifically to a tire truing machine.

When a vehicle is driven with tires either out of balance or out of alignment, the tires are worn in such a manner that the tread portion thereof does not have the desired uniform curvature. When tires which are so worn are balanced and trued, they do not run properly on the road due to the worn portion thereof. It is therefore highly desirable to restore the original curvature to the tread of such tries so that they may properly engage the roadway over which they are driven.

It is therefore the primary object of this invention to provide an improved tire truing machine which may be utilized for the convenient restoring of the curvatures to the tread portion of a tire.

Another object of this invention is to provide an improved tire truing machine which includes an abrading member engageable with a tread portion of a tire for grinding portions thereof to true the surface of the tread, the machine being of such a nature whereby the effective surface being ground may be varied as desired so that the machine may accommodate different sizes of tires.

Another object of this invention is to provide an improved tire truing machine which is provided with rotatable tire mounting means of an extremely simple construction whereby tires mounted on wheels of various sizes may be quickly and conveniently mounted in the tire truing machine.

Another object of this invention is to provide an improved tire truing machine which is provided with tire mounting means which are pivotally mounted for oscillatory moving with respect to an abrading member, the machine including means for continuously oscillating such tire mounting means.

A further object of this invention is to provide an improved tire truing machine which is automatic in operation once the machine is set to accommodate a tire to be trued, the machine being provided with necessary adjustments whereby tires of various sizes and types may be trued as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a top plan view of the tire truing machine of Figure 1 with the top of the supporting frame being omitted to clearly illustrate the means for oscillating a tire carried by the machine with respect to abrading means thereof;

Figure 5 is a fragmentary elevational view of a valve for controlling oscillation of a tire carried by the tire truing machine and shows the manner in which the same is mounted;

Figure 6 is a bottom plan view of the valve of Figure 5 and shows the general construction thereof;

Figure 8 is a fragmentary sectional view taken substantially upon the plane indicated by the section line 8—8 of Figure 7.

Figure 1:
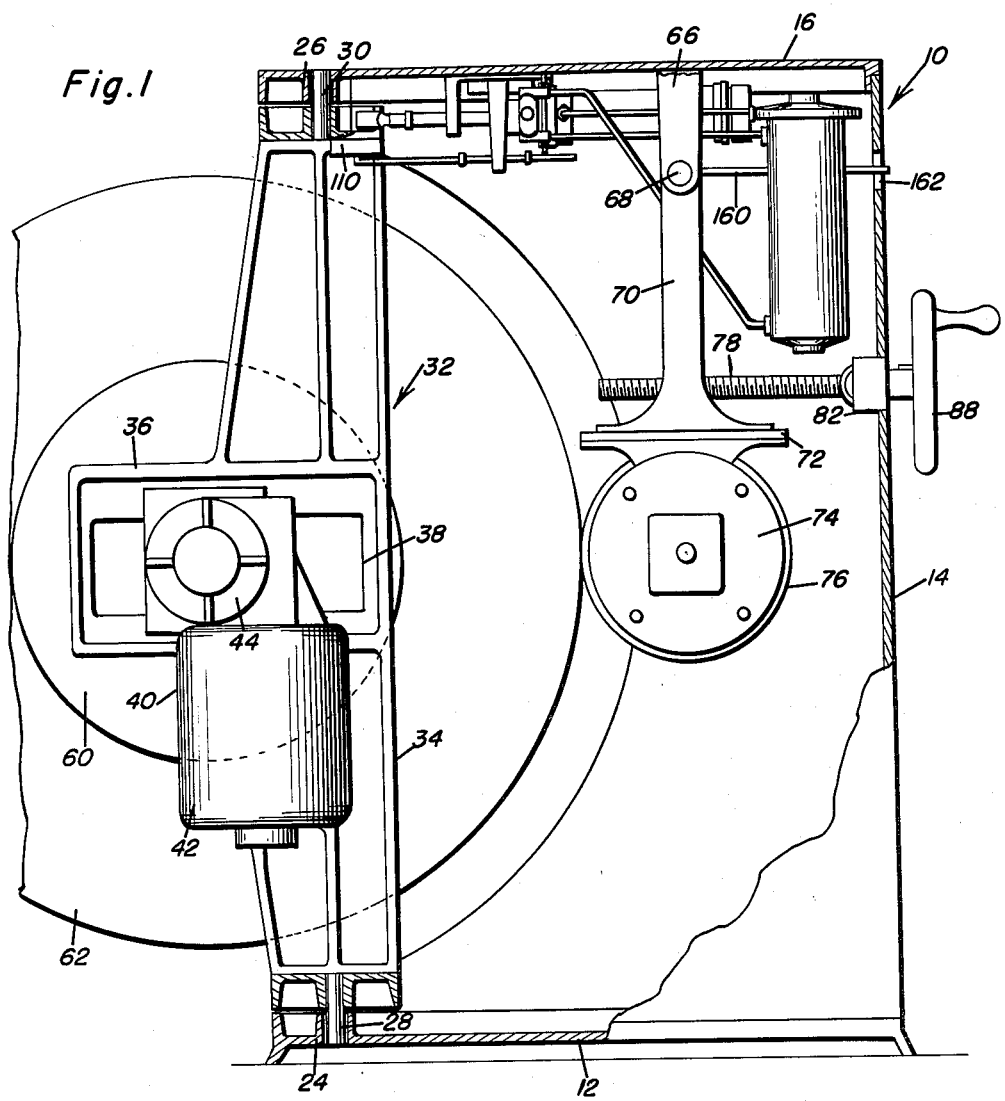
Figure 1 is a side elevational view of the tire truing machine which is the subject of this invention, a portion of the supporting frame thereof being broken away and shown in section in order to clearly illustrate the relationship of various portions of the machine.

Referring now to the drawings in detail, it will be seen that there is illustrated the tire truing machine which is the subject of this invention. The tire truing machine includes a supporting frame which is referred to in general by the reference numeral 10. The supporting frame 10 includes a base 12, and upstanding removable front wall 14, a top wall 16 and side walls 18 and 20. The side wall 18 is a full length side wall whereas the side wall 20 is a fragmentary side wall for seasons to be readily seen hereinafter. The supporting frame 10 also includes a rear wall 22 which is also fragmentary.

The base 12 is provided with a suitable journal portion 24 which is in vertical alignment with a journal portion 26 formed integral with the underside of the top wall 16. Suitably journaled in the journal portions 24 and 26 are pins 28 and 30, respectively. The pins 28 and 30 are carried by a vertically extending mounting frame which is referred to in general by the reference numeral 32. The mounting frame 32 extends between the base 12 and the top wall 16 at the rear of the supporting frame 10.

The mounting frame 32 includes a vertically extending portion 34 and an intermediate horizontal portion 36. The vertical portion 34 and the horizontal portion 36 are suitably ribbed for reinforcement. The horizontal portion 36 extends rearwardly from the vertical portion 34 and includes a mounting slot 38.

Adjustably secured to the horizontal portion 36 which functions as a mounting plate is a wheel mounting unit which is referred to in general by the reference numeral 40. The wheel mounting unit 40 includes an electric motor 42 which has connected thereto a reduction gear box 44. Extending from the reduction gear box 44 is a shaft 46. The shaft 46 passes through the mounting slot 38 and the wheel mounting unit 40 is adjustably secured to the horizontal portion 36 for positioning relative to the front panel 14.

Figure 3:
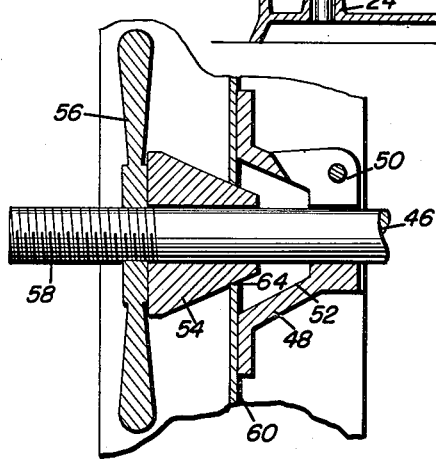
Figure 3 is an enlarged fragmentary sectional view showing the general contruction of the wheel mounting means of the machine.

Referring now to Figure 3 in particular, it will be seen that the shaft 46, which is rotated by the reduction motor 42, is provided with a collar 48. The collar 48 is adjustably retained on the shaft 46 by suitable clamp means 50. The collar 48 is provided with a truncated conical socket 52 which is intended to receive a truncated conical member 54. The conical member 54 is provided with a hand wheel 56 and is threadedly engaged on a threaded end portion 58 of the shaft 46.

When a tire is to be trued through the use of the tire truing machine, the entire tire assembly which includes a wheel 60 as well as the tire 62 is removed from a vehicle and inserted on the shaft 46 with the center portion of the wheel 60 bearing against the collar 48. The truncated cone 54 then passes through a central opening 64 in the wheel 60 to center the same relative to the shaft 46 and clamp the same for rotation with the shaft 46.

Carried by the top wall 16 adjacent the side walls 18 and 20 are depending lugs 66. The lugs 66 have extending therebetween a horizontal shaft 68. Pivotally carried by the shaft 68 between the lugs 66 is a support 70, the support 70 terminating at its lower end in a motor mounting plate 72. Secured to the underside of the motor mounting plate 72 in inverted relation is an electric motor 74. The electric motor 74 has mounted on an armature shaft thereof for rotation a grinding wheel 76, the grinding wheel 76 being intended to be positioned coplanar of the center of the tire 62.

Figure 7:
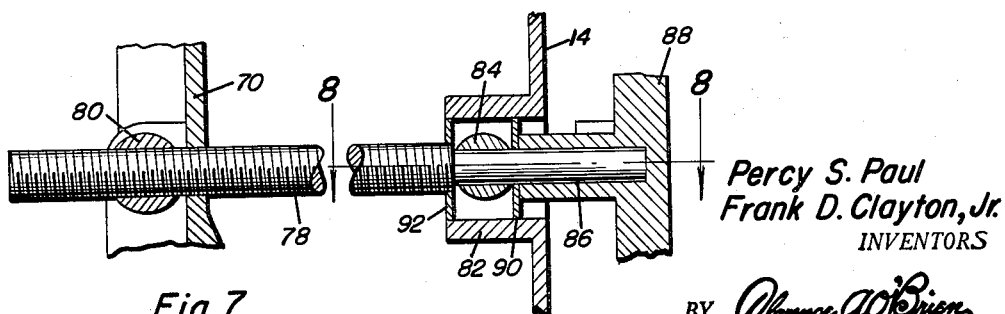
Figure 7 is a fragmentary sectional view showing the manner in which a control shaft for positioning the abrading means is mounted.
Figure 2:
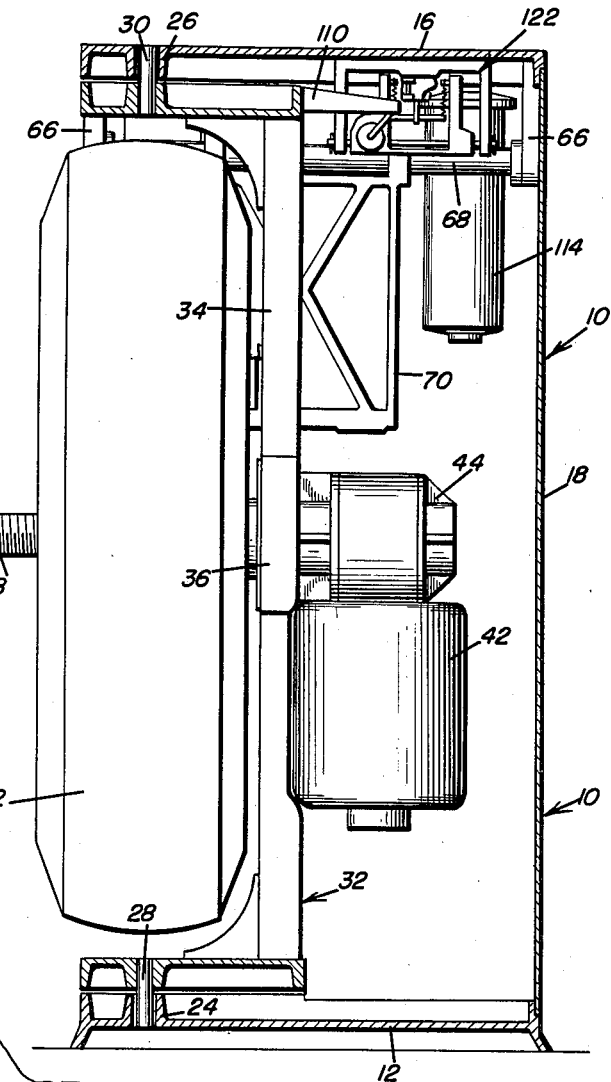
Figure 2 is an end elevational view of the tire truing machine of Figure 1 with portions of both a supporting frame and a mounting frame being broken away and shown in section in order to clearly illustrate the manner in which the mounting frame is pivotally supported with respect to the supporting frame.

As is best illustrated in Figures 1 and 7, the grinding wheel 76 is positioned relative to the mounting frame 32 by pivoting the support 70 about the shaft 68. In order to retain the grinding wheel 76 in an adjusted position, there is provided an elongated threaded shaft 78 which has one end portion thereof threadedly engaged in a shaft 80 pivotally carried by the middle portion of the support 70, the shaft 78 extending transversely of the shaft 80.

The front panel 14 is provided with a rearwardly extending annular flange 82 on the rear side thereof. Mounted within the annular flange 82 for pivotal movement is a shaft 84. The shaft 84 is parallel to the shaft 80 and has extending therethrough a reduced unthreaded forward end portion 86 of the threaded shaft 78.

The end portion 86 of the threaded shaft 78 is provided with a hand wheel 88 which is disposed in front of the front panel 14. The hand wheel 88 is spaced from the shaft 84 by a suitable washer 90. Secured to the threaded shaft 78 at the intersection of the threaded portion with the front portion 86 is a collar 92. The collar 92 engages against a rear portion of the shaft 84. As is best illustrated in Figure 8, the shaft 84 is provided with a rearwardly extending bore 94 in which is disposed a coil spring 96 and a rearwardly extending ball 98. The ball 98 is selectively positionable in a plurality of sockets 100 formed in the front base of the collar 92, for a reason to be set forth in more detail hereinafter.

Secured to the underside of the top wall 16 in spaced parallel relation thereto by a pair of mounting brackets 102 is a fluid cylinder which is referred to in general by the reference numeral 104. A fluid cylinder 104 is of a conventional type and includes an extensible plunger 106. The extensible plunger 106 is pivotally connected by a pivot pin 108 to an inwardly extending flange 110 carried by the mounting frame 32 at the upper part thereof.

Suitably suspended from the top wall 16 adjacent the front panel 14 is a hydraulic cylinder 112. A second hydraulic cylinder 114 is secured to the top wall 16 adjacent the front panel 14 and in spaced relation with respect to the hydraulic cylinder 112. The hydraulic cylinder 112 is connected to one end of the fluid cylinder 104 by a line 116 and the hydraulic cylinder 114 is connected to the other end of the fluid cylinder 104 by a line 118.

The tire truing machine is provided with a compressed air line 120 which is connected to a suitable valve mechanism which is referred to in general by the reference numeral 122. The valve mechanism 122 also has connected thereto a compressed air line 124 whose opposite end is connected to the hydraulic cylinder 114. A second compressed air line 126 extends between the valve mechanism 122 and the hydraulic cylinder 112.

It will be understood that the valve mechanism 122 selectively connects one of the hydraulic cylinders 112 and 114 to the compressed air line 120 while venting the other to the open air. The compressed air lines enter their respective hydraulic cylinders at the top thereof whereas the lines between the hydraulic cylinders and the ends of the fluid cylinder 104 are connected to the bottoms of the hydraulic cylinders. The last mentioned lines, together with lower portions of the hydraulic cylinders are filled with hydraulic fluid so that when compressed air enters the top of any one of the hydraulic cylinders 112 and 114, hydraulic fluid under pressure is pumped or forced into a corresponding end of the fluid cylinder 104 to move the extensible plunger 106 accordingly. Inasmuch as the extensible plunger 106 is connected to the mounting frame 23, the movement thereof results in the pivoting of the mounting frame 32 and the tire 62 carried thereby. Thus the tire 62 is pivoted with respect to the grinding wheel 76.

In order that the mounting frame 32 and the tires 62 may automatically be oscillated through the use of the fluid cylinder 104, the valve means 122 is provided with suitable means for automatically actuating the same.

As is best illustrated in Figures 5 and 6, the valve means 122 includes a mounting plate 128 which is secured to the underside of the top wall 16. The mounting plate 128 has connected thereto a conventional four-way valve 130. The four-way valve 130 has connected thereto the compressed air lines 120, 124 and 126 in the relationship best illustrated in Figure 5. The valve 130 also includes a pair of vent openings (not shown) which are selectively communicated with the compressed air lines 124 and 126. It will be understood that the valve 130 is a conventional four-way valve.

The mounting plate 128 includes a pair of depending arms 136 which have extending between the lower ends thereof a shaft 138. Pivotally mounted on the shaft 138 is a yoke 140 which includes a pair of upstanding legs 142. The legs 142 are connected by springs 144 and a bar 146 to a trip lever 148 for the valve 130.

The yoke 140 is provided with a suitable swivel 150 through which passes a rod 152. The rod 152 has mounted thereon spaced stops 154 engageable with the yoke 140 to pivot the same to trip the valve 130. One end of the rod 152 is pivotally connected to the flange 110 in the manner best illustrated in Figures 1 and 4.

In the operation of the tire truing machine, a tire 62 to be trued is measured to determine the desired curvature to which the tread thereof must be ground. Then through the use of the hand wheel 88, the grinding wheel 76 is positioned relative to the mountnig frame 32. The relative position of the grinding wheel 76 is indicated by a pointer 160 which is connected to the shaft 68 for rotation therewith, a forward end of the pointer 160 extending through a slot 162 in the front panel 14 and being associated with a suitable dial (not shown).

After the grinding wheel 76 has been properly positioned a tire 62 and its associated wheel 60 is mounted on the wheel mounting unit 40. Then the entire wheel mounting unit 40 is slid forwardly until such time as the center of the tread of the tire 62 engages the grinding wheel 76, the grinding wheel not being rotated at the time.

After the grinding wheel 76 and the tire 62 have been properly positioned relative to each other, the electric motors 74 and 42 are actuated to rotate both the tire 62 and the grinding wheel 74. Also, compressed air is permitted to enter the compressed air line 120.

This results in the initial movement of the plunger 106 either rearwardly or forwardly to pivot the tire 62 transversely of the grinding periphery of the grinding wheel 76. Inasmuch as the tire 62 is mounted for pivotal movement about an axis remote from the grinding wheel 76, it will be seen that the tread of the tire 66 moves in an arcuate path transversely of the grinding wheel 76. As the plunger 106 reaches the end of its stroke, one of the stops 154 will engage the yoke 140 to cause tripping of the valve 130. A flow of hydraulic fluid to the fluid cylinder 104 is reversed to cause a reversal of movement of the plunger 106. This results in the pivoting of the tire 62 in an opposite direction. Thus it will be seen that the tire 62 is continuously oscillated transversely of the grinding wheel 76 so that an arcuate tread is ground thereon, the tread being ground being true.

As the grinding process continues, the grinding wheel 76 may be slowly advanced toward the tire 62 so as to insure the grinding of a proper amount of tread to provide a true tread surface. The amount the grinding wheel 76 is being advanced toward the tire 62 may be determined by the operator of the tire truing machine due to the repeated engagement of the ball 98 into the sockets 100. Thus, the operator may count the number of clicks or notches and thereby accurately determine the amount which the grinding whele 76 has been fed.

In view of the foregoing, it will be seen that there has been illustrated and described a tire truing machine which is so designed whereby a tire may be accurately trued with a minimum of effort on the part of an operator of such a machine once it has been properly set. It also will be seen that the tire truing machine is of such a nature whereby tires of all sizes may be accommodated and may have their treads ground to their original curvature.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A tire truing machine comprising a supporting frame including a base and a top wall interconnected at one end by vertical frame members, a mounting frame extending between opposite ends of said base and top wall and pivotally attached thereto, a wheel support adjustably carried by said mounting frame, an abrading member depending from said top wall and being pivotally mounted for controlled movement towards and away from said wheel support, and drive means for oscillating said mounting frame whereby a tire and wheel carried by said wheel support is oscillated in and out of the plane of said abrading member.

2. A tire truing machine comprising a supporting frame including a base and a top wall interconnected at one end by vertical frame members, a mounting frame extending between opposite ends of said base and top wall and pivotally attached thereto, a wheel support adjustably carried by said mounting frame, an abrading member depending from said top wall and being pivotally mounted for controlled movement towards and away from said wheel support, and drive means for oscillating said mounting frame whereby a tire and wheel carried by said wheel support is oscillated in and out of the plane of said abrading member, said drive means including an extensible fluid cylinder having a plunger connected to said mounting frame, valve means connected to said fluid cylinder for controlling the operation of said fluid cylinder.

3. A tire truing machine comprising a supporting frame including a base and a top wall interconnected at one end by vertical frame members, a mounting frame extending between opposite ends of said base and top wall and pivotally attached thereto, a wheel support adjustably carried by said mounting frame, an abrading member depending from said top wall and being pivotally mounted for controlled movement towards and away from said wheel support, and drive means for oscillating said mounting frame whereby a tire and wheel carried by said wheel support is oscillated in and out of the plane of said abrading member, said drive means including an extensible fluid cylinder having a plunger connected to said mounting frame, valve means connected to said fluid cylinder for controlling the operation of said fluid cylinder, said valve means being connected to said mounting frame for actuation thereby.

4. A tire truing machine comprising a supporting frame including a base and a top wall interconnected at one end by vertical frame members, a mounting frame extending between opposite ends of said base and top wall and pivotally attached thereto, a wheel support adjustably carried by said mounting frame, an abrading member depending from said top wall and being pivotally mounted for controlled movement towards and away from said wheel support, and drive means for oscillating said mounting frame whereby a tire and wheel carried by said wheel support is oscillated in and out of the plane of said abrading member, said drive means including an extensible fluid cylinder having a plunger connected to said mounting frame, valve means connected to said fluid cylinder for controlling the operation of said fluid cylinder, said fluid cylinder being a compressed air motor, air supply tanks carried by said supporting frame and connected to said fluid cylinder through said valve means.

References Cited in the file of this patent

UNITED STATES PATENTS

| | | |
|---|---|---|
| 1,542,876 | Hanson | June 23, 1925 |
| 1,815,014 | Smith | July 14, 1931 |
| 2,294,047 | Pollock | Aug. 25, 1942 |
| 2,392,667 | Hawkinson | Jan. 8, 1946 |
| 2,572,114 | Cratsenberg | Oct. 23, 1951 |